(12) United States Patent
Maier et al.

(10) Patent No.: US 7,588,418 B2
(45) Date of Patent: Sep. 15, 2009

(54) METHODS AND APPARATUS FOR ASSEMBLING TURBINE ENGINES

(75) Inventors: Alexander George Maier, Cincinnati, OH (US); William Ralph Maskiell, Batavia, OH (US)

(73) Assignee: General Electric Company, Schenectady, NY (US)

( * ) Notice: Subject to any disclaimer, the term of this patent is extended or adjusted under 35 U.S.C. 154(b) by 498 days.

(21) Appl. No.: 11/523,675

(22) Filed: Sep. 19, 2006

(65) Prior Publication Data
US 2008/0078845 A1 Apr. 3, 2008

(51) Int. Cl.
*B05B 12/00* (2006.01)

(52) U.S. Cl. .................. 415/196; 415/209.3; 415/213.1; 415/209.2

(58) Field of Classification Search .................. 415/196, 415/209.2, 209.3, 213.1
See application file for complete search history.

(56) References Cited

U.S. PATENT DOCUMENTS

| 1,328,443 | A | * | 1/1920 | Marburger et al. .......... 411/203 |
|---|---|---|---|---|
| 2,738,949 | A | * | 3/1956 | Wilkinson ................ 415/209.2 |
| 3,026,087 | A | * | 3/1962 | Welsh ....................... 415/209.2 |
| 4,204,803 | A | * | 5/1980 | Leger et al. ............... 415/209.2 |
| 4,286,921 | A | * | 9/1981 | Donlan et al. ................ 415/136 |
| 4,749,125 | A | | 6/1988 | Escallon et al. |
| 4,901,523 | A | | 2/1990 | Huelster |
| 5,131,811 | A | * | 7/1992 | Johnson .................... 415/209.2 |
| 5,224,825 | A | * | 7/1993 | Strang et al. ............. 415/209.3 |
| 5,267,828 | A | * | 12/1993 | Lenhart et al. .................. 415/9 |
| 5,289,623 | A | | 3/1994 | Ohtsubo |
| 5,333,995 | A | | 8/1994 | Jacobs et al. |
| 5,509,508 | A | | 4/1996 | Evans |
| 5,893,518 | A | | 4/1999 | Bruchez, Jr. et al. |
| 6,672,833 | B2 | * | 1/2004 | MacLean et al. ............ 415/196 |
| 6,860,722 | B2 | | 3/2005 | Forrester et al. |

* cited by examiner

*Primary Examiner*—Igor Kershteyn
(74) *Attorney, Agent, or Firm*—William Scott Andes, Esq.; Armstrong Teasdale LLP

(57) ABSTRACT

A method of assembling a turbine engine is provided. The method includes providing a bushing including at least one retaining mechanism formed integrally therewith, coupling a shim to the bushing such that at least one retainer extending from the shim is received within the bushing retaining mechanism, and coupling the bushing and shim within the turbine engine to facilitate aligning a first engine component relative to a second engine component.

20 Claims, 5 Drawing Sheets

METHODS AND APPARATUS FOR ASSEMBLING TURBINE ENGINES

BACKGROUND OF THE INVENTION

This invention relates generally to turbine engines and, more specifically, to nozzle assemblies used with turbine engines.

At least some known turbine engines include a variable exhaust nozzle system, such as is typical of supersonic military aircraft. The variable exhaust nozzle system enables the geometry of the exhaust system to selectively change. More specifically, variable geometry systems are configured to operate over a wide range of pressure ratios by adjusting a nozzle throat based on the demands of the engine cycle, and adjusting a nozzle area ratio to facilitate achieving a desired engine performance at various operating points.

At least one known engine includes a fixed exhaust nozzle system that facilitates enhanced engine performance through adjustments to a plurality of flow path liners spaced circumferentially about the exhaust nozzle such that the liners partially define such assemblies, the flow path liners are coupled via a plurality of connections to a structural member within the engine or fuselage, such as a duct. Because of the thermal expansion, flow path liners are generally loosely supported and may be difficult to adjust. To facilitate reducing discontinuities between liner sections and to facilitate maintaining a desired flow path contour, at least some exhaust nozzles include the use of a plurality of shims.

At least some known shims include peelable layers having an adhesive applied to an outer surface thereof for positioning within the nozzle assembly. The peelable layers are removed to adjust the thickness of the shim. This shim is positioned within the nozzle assembly for adjusting the liner geometry. Additionally, at least some known shims are loose stackable washers that are positioned within the nozzle assembly for adjusting the flow path contour. However, coupling mechanisms used with such shims may become ineffective during engine operation because of exposure to high temperatures, or because of being subjected to side loading or motion. As such, the shims may fall to the lowest level of the nozzle assembly during assembly or disassembly. Accordingly, adjustments to the nozzle assembly may be a time consuming task. Adjustable height bushings facilitate alleviating fit-up issues with known bushings. Some known adjustable height bushings require a large envelope to incorporate them into the nozzle assembly. Additionally, such bushings add significant cost and weight to the exhaust system. If the fittings are not in the necessary locations when assembly of the supporting structure is attempted, retrofit of the adjustable height features is unlikely to be feasible.

BRIEF DESCRIPTION OF THE INVENTION

In one aspect, a method of assembling a component for use in a turbine engine is provided. The method includes providing a bushing including at least one retaining mechanism formed integrally therewith, coupling a shim to the bushing such that at least one retainer extending from the shim is received within the bushing retaining mechanism, and coupling the bushing and shim within the turbine engine to facilitate aligning a first engine component relative to a second engine component.

In a further aspect, a shim assembly is provided. The shim assembly includes a bushing including a retaining mechanism, and a shim including at least one retainer and a body, the at least one retainer being configured to be received within a portion of the retaining mechanism when the shim is coupled to the bushing.

In a further aspect, an exhaust nozzle assembly is provided. The exhaust nozzle assembly includes an exhaust nozzle, at least one flow path liner configured to couple to a radially inward wall of the exhaust nozzle, a bushing including a retaining mechanism configured to be positioned adjacent at least one flow path liner, and a shim including at least one retainer and a body, the at least one retainer being configured to be received within a portion of the retaining mechanism when the shim is coupled to the bushing.

DETAILED DESCRIPTION OF THE INVENTION

Figure 1:
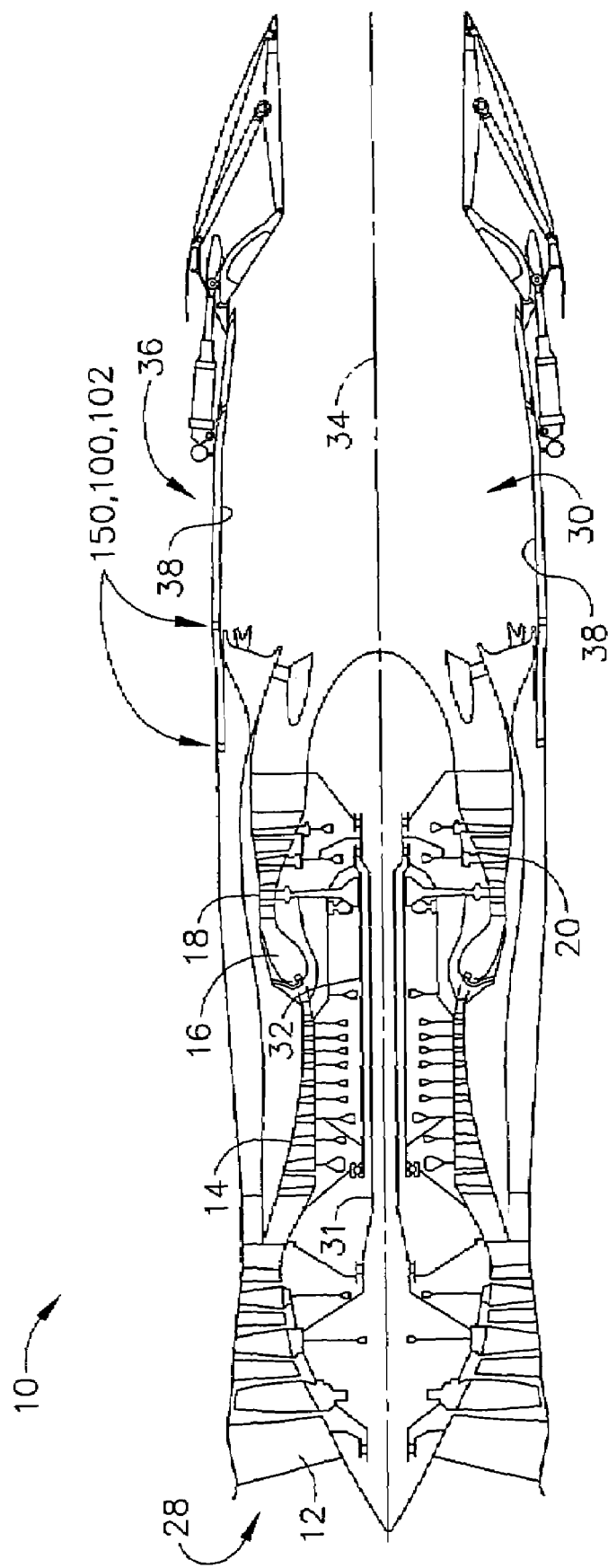
FIG. 1 is a schematic illustration of an exemplary gas turbine engine.

Referring to the figures, FIG. 1 is a schematic illustration of a turbine engine 10 that includes, in an exemplary embodiment, a fan assembly 12, a high pressure compressor 14, and a combustor 16. Engine 10 also includes a high pressure turbine 18, and a low pressure turbine 20. Engine 10 has an intake side 28 and an exhaust side 30. Exhaust side 30 includes an exhaust nozzle 36 and at least one flow path liner 38 adjacent a radially inward wall of exhaust nozzle 36. In one embodiment, engine 10 is a F110 available from General Electric Company, Cincinnati, Ohio. Fan assembly 12 and low pressure turbine 20 are coupled by a first rotor shaft 31, and compressor 14 and high pressure turbine 18 are coupled by a second rotor shaft 32.

During operation, air flows axially through fan assembly 12, in a direction that is substantially parallel to a central axis 34 extending through engine 10, and compressed air is supplied to high pressure compressor 14. The highly compressed air is delivered to combustor 16. Combustion gas flow from combustor 16 drives turbines 18 and 20. Turbine 18 rotates compressor 14 via shaft 32 and turbine 20 drives fan assembly 12 via shaft 31.

In the exemplary embodiment, exhaust nozzle 36 includes a non-circular exhaust system (not shown). Alternatively, exhaust nozzle 36 includes an axi-symmetric or substantially circular exhaust system (not shown). More specifically, in the exemplary embodiment, a circumferential series of flow path liners 38 partially define a convergent flowpath (not shown) that establishes a desired nozzle throat A8 (not shown) for nozzle 36. Flow path liners 38 are coupled using a plurality of couplings such that a series of flow path liners 38 extend circumferentially about engine nozzle 36. Moreover, a plurality of couplings are also used to couple flow path liners 38 to a structural member within engine 10 such as a duct (not shown).

Figure 2:
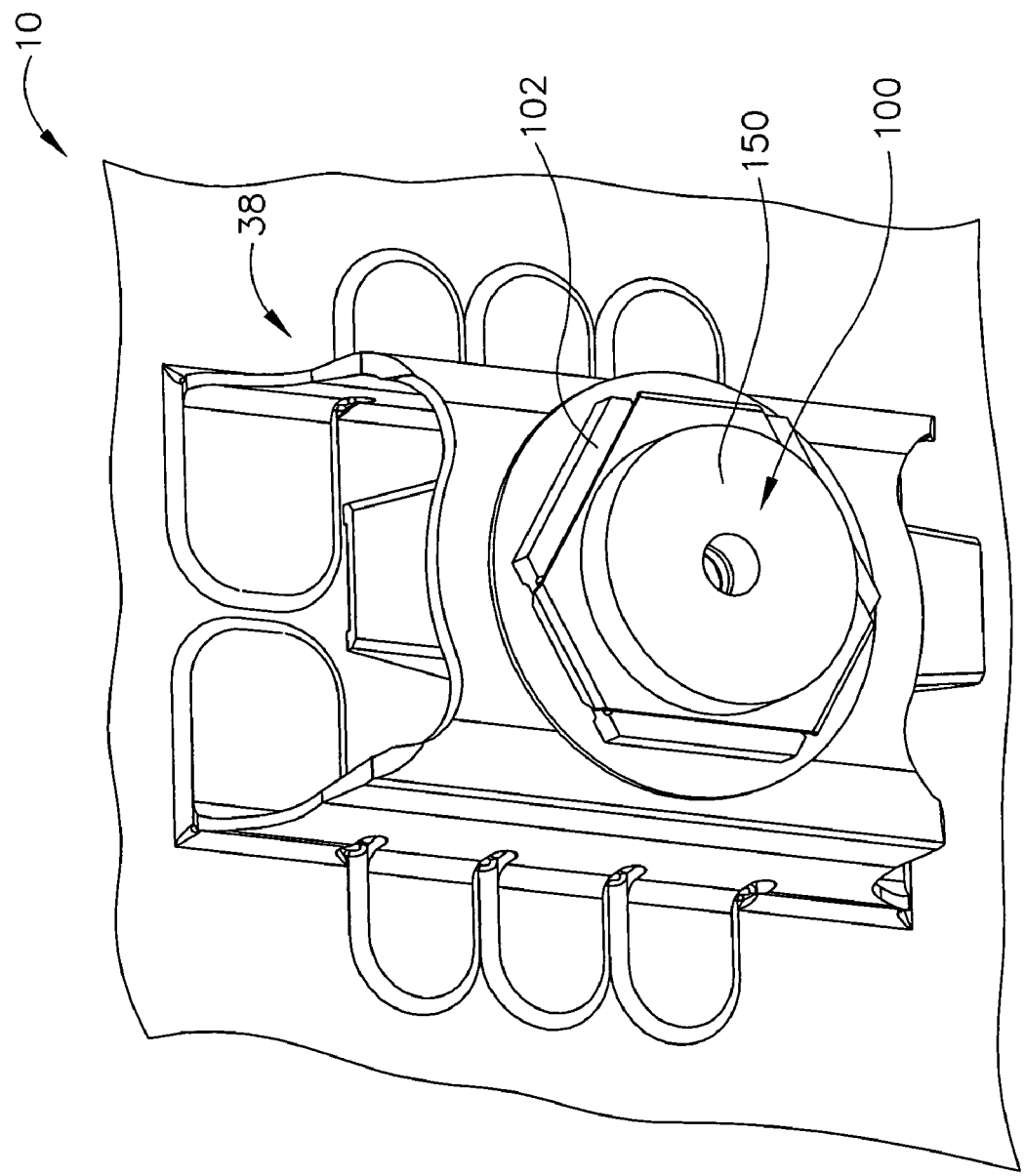
FIG. 2 is a perspective view of a shim and bushing coupled to a portion of a turbine engine shown in FIG. 1.
Figure 3:
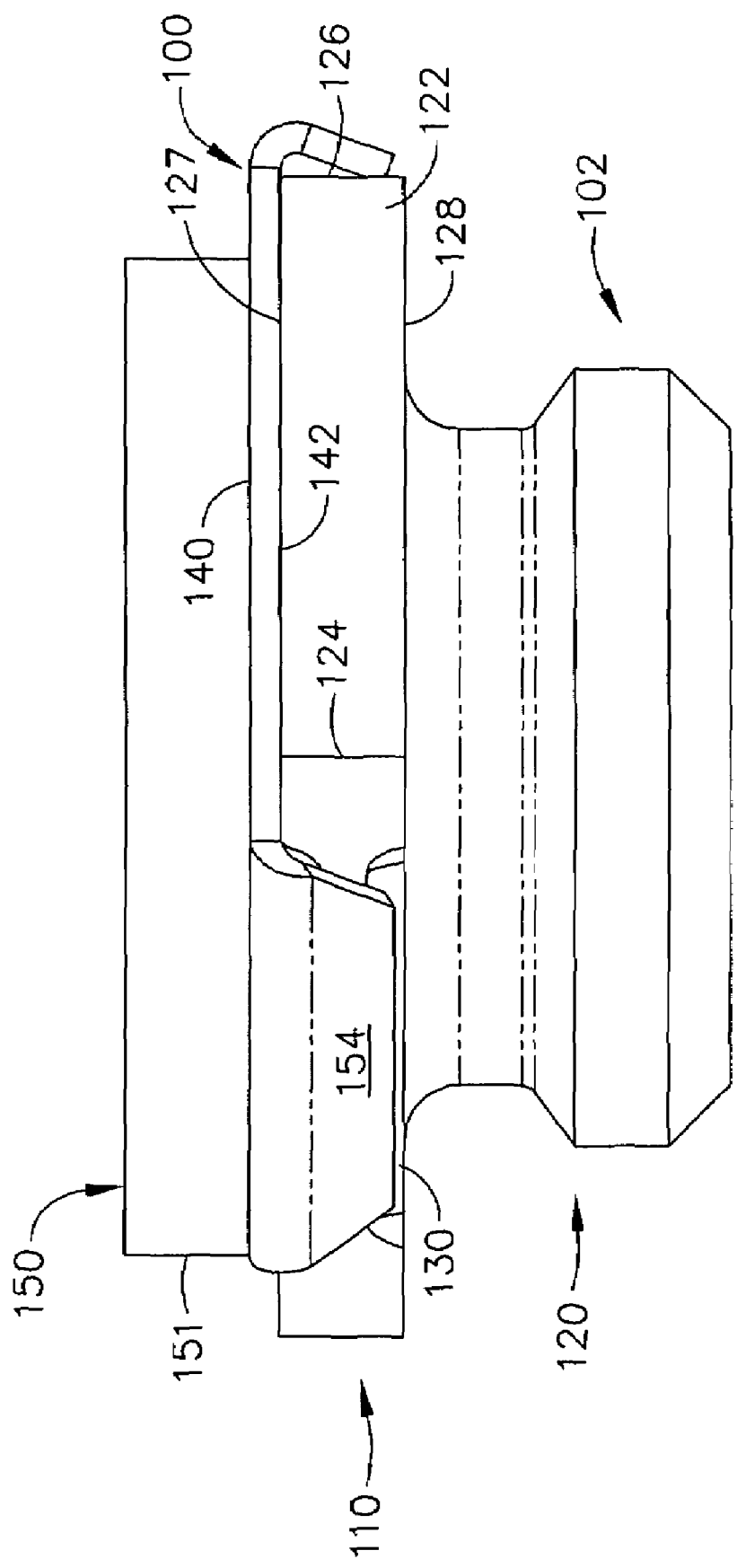
FIG. 3 is a side view of the exemplary shim coupled to a bushing, both of which may be used with the engine shown in FIG. 1.
Figure 4:
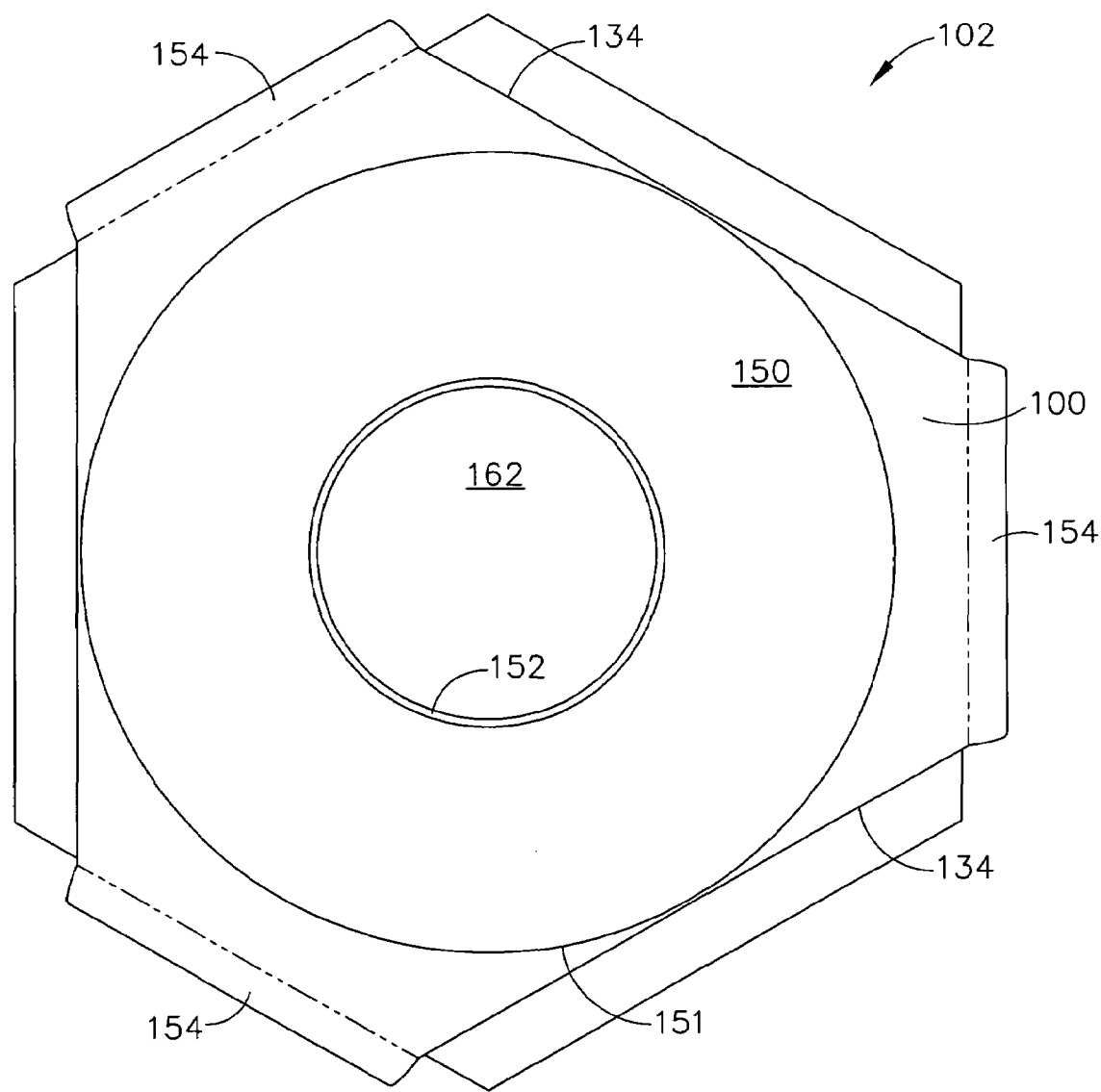
FIG. 4 is a top view of the shim shown in FIG. 3.
Figure 5:
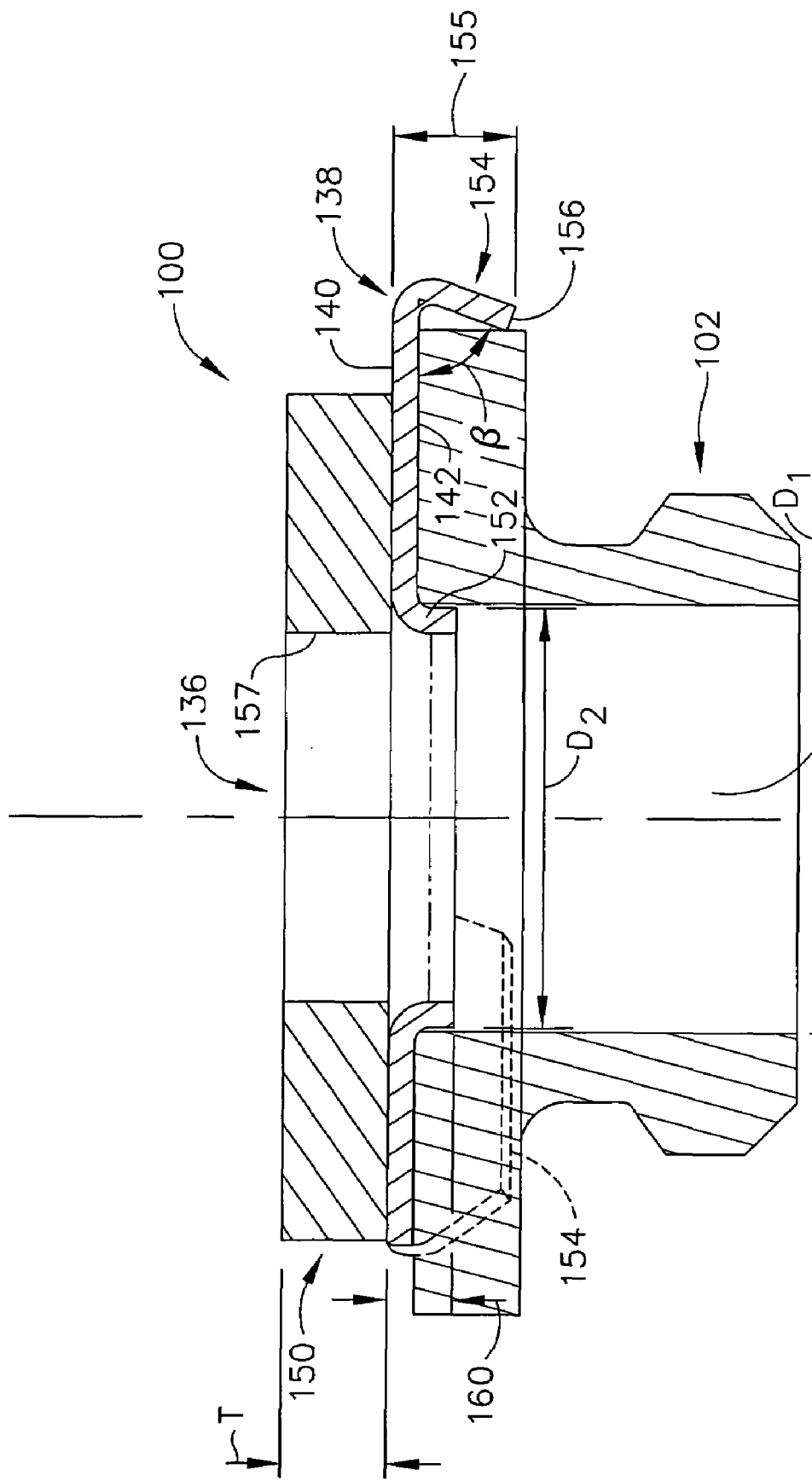
FIG. 5 is a cross-sectional view of the exemplary shim and bushing shown in FIGS. 3 and 4.

FIG. 2 is a perspective view of a shim 100 and a bushing 102 coupled to a portion of a turbine engine 10. FIG. 3 is a side view of shim 100 coupled to bushing 102 that may be used with engine 10 (shown in FIG. 1). FIG. 4 is a top view of shim 100. FIG. 5 is a cross-sectional view of shim 100 and bushing 102.

Generally, at least one bushing 102 is used with each coupling. The operation of flow path liners 38 is selectively adjustable with the use of a plurality of shims 100. Shims 100 facilitate adjustments to the flow path geometry by providing varying thicknesses adjacent each bushing. In the exemplary embodiment, shims 100 and bushings 102 are each fabricated from, but are not limited to being made from, sheet metal.

In the exemplary embodiment, each bushing 102 is positioned within exhaust nozzle 36 between flow path liners 38 and a structural member (not shown in FIG. 2). Shim 100 is coupled to bushing 102 and shim 100 is configured to abut the structural member.

In an alternative embodiment, engine 10 does not include bushing 102. Rather, engine 10 includes a component that is configured to receive shim 100. For example, the component may be a shaft that includes a retaining mechanism, described in more detail below.

Moreover, in the exemplary embodiment, bushing 102 is a hexagonally shaped bushing. Alternatively, bushing 102 may have any other non-hexagonal shape that enables bushing 102 to function as described herein. Bushing 102 includes a bore 104 extending therethrough (shown in FIG. 5). In the exemplary embodiment, bore 104 is a counterbore. Bore 104 includes a diameter $D_1$. Bushing 102 further includes a top portion 110 and a bottom portion 120. A plurality of sidewalls 122 circumscribe top portion 110.

In the exemplary embodiment, each sidewall 122 includes at least one retaining mechanism 130. Alternatively, each sidewall 122 does not include a retaining mechanism 130. Each sidewall 122 extends generally circumferentially between a first edge 124 and a second edge 126, and generally axially between an upper surface 127 and a lower surface 128. In the exemplary embodiment, retaining mechanism 130 is a chamfer (i.e. a slot) defined within a portion of each sidewall 122. More specifically, in the exemplary embodiment, retaining mechanism 130 is defined along only a portion of sidewall 122 between first and second edges 124 and 126 adjacent lower surface 128. Furthermore, in the exemplary embodiment, retaining mechanism 130 is recessed with respect to an outer surface of sidewall 122 surrounding mechanism 130. Alternatively, retaining mechanism 130 may be defined at any location within sidewall 122 that enables mechanism 130 to function as described herein.

Bushing 102 facilitates retaining shim 100 in position against bushing 102, such that a portion of shim 100 is received within retaining mechanism 130. In the exemplary embodiment, shim 100 is hexagonally-shaped and includes six sidewalls 134 as shown in FIG. 4. Alternatively, shim 100 has any non-hexagonal shape that enables shim 100 to function as described herein. In the exemplary embodiment, shim 100 includes an opening 136 that extends therethrough and is configured to substantially concentrically align with bore 104. Shim 100 is formed with a retainer 138 that includes an upper surface 140 and a lower surface 142, and that is sized and shaped to be received within retaining mechanism 130. Shim 100 also includes a body 150 having a thickness T that is variably selected. Alternatively, shim 100 does not include body 150.

Retainer 138 is formed with an alignment portion 152 and an integrally formed anchor portion 154. In the exemplary embodiment, shim 100 includes at least three anchor portions 154 that are spaced apart from one another such that at least one sidewall 134 extends between each pair of anchor portions 154. Anchor portion 154 extends outward from retainer 138 at an angle β. In the exemplary embodiment, angle β is less than 90 degrees. Alternatively, angle β may be equal to or greater than 90 degrees. Additionally, anchor portion 154 extends from retainer 138 to an end 156 for a length 155.

Alignment portion 152 also extends from retainer 138 along an inner surface 157 of opening 136. Alignment portion 152 has an outer diameter $D_2$ (shown in FIG. 5). In the exemplary embodiment, $D_1$ of bushing 104 is slightly larger than $D_2$ of alignment portion 152. Alternatively, $D_2$ is approximately equal to $D_1$. As described in more detail below, alignment portion 152 facilitates retention of shim 102 against bushing 100. In the exemplary embodiment, anchor portion length 155 is longer than a length 160 of alignment portion 152. Alternatively, anchor portion length 155 is approximately the same as, or shorter than, alignment portion length 160.

Body 150 extends outward from upper surface 140. In the exemplary embodiment, body 150 is toroidal. Body 150 can be fabricated with a variety of thicknesses that depend on the use of shim 100. Generally, body 150 has a signature footprint that is smaller than a cross-sectional area of top portion 110 of bushing 102. As such, the outer circumferential body 150 as described by edges 151 does not extend outward beyond sidewalls 122. In an alternative embodiment, each edge 151 extends outward beyond sidewalls 122.

In the exemplary embodiment, bushing 102 includes six retaining mechanisms 130 and shim 100 includes three retainers 138. Shim 100 may include lead-in features that provide snap-in features of retainers 138 into retaining mechanisms 130. Alternatively, bushing 102 may include any number of retaining mechanisms 130 and shim 100 may include any number of retainers 138.

During assembly and during use, in the exemplary embodiment, shim 100 is coupled to bushing 102 via a snap-fit. Notably, the snap-fit requires no adhesive to couple shim 100 to bushing 102. More specifically, where shim 100 is coupled to bushing 102, shim lower surface 142 is coupled against bushing upper surface 127 and each retainer end 156 is received within a respective retaining mechanism 130. Moreover, when shim 100 is coupled to bushing 102, bore 104 and shim opening 136 are aligned substantially concentrically with respect to each other. More specifically, shim 100 does not comprise the wrenching capability of bushing 102 and is not affected by the temperatures of engine 10 generated during engine operation.

Anchor portions 154 are received within respective retaining mechanisms 130 of bushing 102. Alignment portion 152 and anchor portions 154 facilitate aligning and retaining shim 100 to bushing 102 with a snap-fit such that alignment portion 152 facilitates retaining shim 100 to bushing 102. Specifically, in the exemplary embodiment, alignment portion 152 is positioned within a portion of bore 104 such that an end of alignment portion 152 mates with a portion of the counterbore. The components of shim 100 and bushing 102 are fabricated such that shim 100 may be coupled to bushing 102 without the use of tools. Shim 100 and bushing 102 may be snap-fit with one another. In use, alignment portion 152 provides resistance to lateral loads during assembly of flow path liners 38.

Furthermore, as shown in FIG. 2, when shim 100 and bushing 102 are coupled together, the assembly forms a passage 162 that passes through the structural member, shim 100, and bushing 102. Passage 162 is configured to receive a bolt. The bolt is screwed into a nut-plate that is integral with a slider in engine 10.

After shim 100 and bushing 102 are coupled together, bushing 102 is coupled between structural member and at least one flow path liner 38 to facilitate altering the shape of exhaust nozzle 36 to a desired shape. Body 150 is configured to abut the structural member (not shown). Shim 100 and bushing 102 also facilitate removing discontinuities in flow path liners 38. Thickness T further facilitates altering the shape of exhaust nozzle 36 such that varying thicknesses T will adjust the height of shim 100.

The method herein includes providing a bushing 102 including at least one retaining mechanism 130 formed integrally therewith. The method further includes coupling a shim 100 to the bushing 102 such that at least one retainer 138 extending from the shim 100 is received within the bushing retaining mechanism 130. Additionally, the method includes coupling the bushing 102 and shim 100 within the turbine engine 10 to facilitate aligning a first engine component relative to a second engine component.

The above-described bushing and shim assembly facilitates reducing the number of parts needed in an exhaust nozzle to alter the flow path of the exhaust nozzle. Additionally, the bushing and shim assembly described in detail above is less expensive and lighter than known bushings. Furthermore, the bushing and shim assembly described above removes discontinuities in the exhaust nozzle and provide an assembly that requires fewer steps to assemble than other known bushing and shim assemblies. Altering flow path liners within an exhaust nozzle increases operability of an engine by increasing efficiency. Specifically, by removing discontinuities in the exhaust nozzle, lower observability goals can be met.

Exemplary embodiments of bushing and shim assemblies are described above in detail. Each bushing and shim is not limited to use with the specific embodiments described herein, but rather, each bushing and shim can be utilized independently and separately from other components described herein. Moreover, the invention is not limited to the embodiments of the bushing and shim described above in detail. Rather, other variations of bushings and/or shims may be utilized within the spirit and scope of the claims.

While the invention has been described in terms of various specific embodiments, those skilled in the art will recognize that the invention can be practiced with modification within the spirit and scope of the claims.

What is claimed is:

1. A method of assembling a component for use in a turbine engine, said method comprising:
    providing a bushing including at least one retaining mechanism formed integrally therewith;
    coupling a shim to the bushing such that at least one retainer extending from the shim is received within the bushing retaining mechanism; and
    coupling the bushing and shim within the turbine engine to facilitate aligning a first engine component relative to a second engine component.

2. A method in accordance with claim 1 wherein the retainer includes at least one anchor portion, said method further comprises aligning the at least one anchor portion within the retaining mechanism.

3. A method in accordance with claim 1 wherein the bushing includes a bore extending at least partially therethrough and the shim further includes an opening and an alignment portion circumscribing the opening, said method further comprises positioning the alignment portion concentrically adjacent the bore to facilitate aligning the shim relative to the bushing.

4. A method in accordance with claim 3, further comprising aligning the alignment portion with the bore to facilitate providing resistance to lateral loads created during positioning of the first engine component with the second engine component.

5. A method in accordance with claim 1 wherein the turbine engine includes a flow path liner and the shim also includes a body having a thickness, said method further comprises removing discontinuities within the flow path liner with the body.

6. A shim assembly for adjusting a position of a flow path liner with respect to a structural member, said shim assembly comprising:
    a bushing comprising a retaining mechanism; and
    a shim coupled to said bushing, said shim comprising at least one retainer and a body, said at least one retainer is configured to be received within a portion of said retaining mechanism when said shim is coupled to said bushing, said shim abuts the structural member when the shim assembly couples the flow path liner to the structural member.

7. A shim assembly in accordance with claim 6 wherein said shim is configured to be coupled to said bushing using a snap-fit.

8. A shim assembly in accordance with claim 6 wherein said shim is configured to be coupled to said bushing without use of adhesive.

9. A shim assembly in accordance with claim 6 wherein said at least one retainer comprises an alignment portion and an anchor portion, said alignment and anchor portions each facilitate retaining said shim adjacent to said bushing.

10. A shim assembly in accordance with claim 6 wherein said body is integrally formed with said at least one retainer, said body comprises a variable thickness that facilitates aligning and retaining said flow path liner to said structural member.

11. A shim assembly in accordance with claim 6 wherein said bushing further comprises a bore extending therethrough, and said shim comprises an opening extending therethrough, said bore is configured to be concentrically aligned with said opening.

12. A shim assembly in accordance with claim 11 wherein said shim further comprises an alignment portion configured to couple to an inner edge of said bore.

13. A shim assembly in accordance with claim 11 wherein said bore comprises a first diameter and said opening comprises a second diameter, said second diameter is larger than said first diameter.

14. An exhaust nozzle assembly comprising:
    an exhaust nozzle;
    at least one flow path liner configured to couple to a radially inward wall of said exhaust nozzle;
    a bushing comprising a retaining mechanism configured to be positioned adjacent at least one radially inward wall; and
    a shim comprising at least one retainer and a body, said at least one retainer is configured to be received within a portion of said retaining mechanism when said shim is coupled to said bushing.

15. An exhaust nozzle assembly in accordance with claim 14 wherein said at least one retainer comprises an alignment portion and an anchor portion, said alignment and anchor portions each facilitate retaining said shim adjacent to said bushing.

16. An exhaust nozzle assembly in accordance with claim 14 wherein said body is integrally formed with said at least one retainer, said body comprises a variable thickness that facilitates aligning and retaining a first engine component to a second engine component.

17. An exhaust nozzle assembly in accordance with claim 14 wherein said bushing further comprises a bore extending therethrough, and said shim comprises an opening extending therethrough, said bore is configured to be concentrically aligned with said opening.

18. An exhaust nozzle assembly in accordance with claim 17 wherein said shim further comprises an alignment portion configured to couple to an inner edge of said bore.

19. An exhaust nozzle assembly in accordance with claim 14 wherein said bore comprises a first diameter and said opening comprises a second diameter, said second diameter is larger than said first diameter.

20. An exhaust nozzle assembly in accordance with claim 14 wherein said shim is configured to be coupled to said bushing using a snap-fit.

* * * * *